(12) United States Patent
Shiroma

(10) Patent No.: US 10,822,859 B2
(45) Date of Patent: Nov. 3, 2020

(54) WINDOW REGULATOR

(71) Applicant: Johnan Manufacturing Inc., Nagano (JP)

(72) Inventor: Tomotaka Shiroma, Nagano (JP)

(73) Assignee: JOHNAN MANUFACTURING INC., Nagano (JP)

( * ) Notice: Subject to any disclaimer, the term of this patent is extended or adjusted under 35 U.S.C. 154(b) by 114 days.

(21) Appl. No.: 16/251,209

(22) Filed: Jan. 18, 2019

(65) Prior Publication Data

US 2019/0226264 A1    Jul. 25, 2019

(30) Foreign Application Priority Data

Jan. 19, 2018   (JP) ................................. 2018-007444

(51) Int. Cl.
*E05F 11/48* (2006.01)
*E05F 15/689* (2015.01)
*B60J 1/17* (2006.01)

(52) U.S. Cl.
CPC .............. *E05F 15/689* (2015.01); *B60J 1/17* (2013.01); *E05F 11/486* (2013.01); *E05Y 2201/224* (2013.01); *E05Y 2201/654* (2013.01); *E05Y 2900/55* (2013.01)

(58) Field of Classification Search
CPC ......... E05F 15/689; E05F 11/486; B60J 1/17; E05Y 2201/224; E05Y 2201/654; E05Y 2900/55
USPC .......................................................... 49/352
See application file for complete search history.

(56) References Cited

U.S. PATENT DOCUMENTS

| | | | | |
|---|---|---|---|---|
| 2,069,219 A | * | 2/1937 | Conlon | ...................... B60J 1/17 |
| | | | | 49/377 |
| 4,119,341 A | * | 10/1978 | Cook | ...................... B60J 1/1861 |
| | | | | 296/146.16 |
| 10,138,670 B2 | * | 11/2018 | Katayama | .............. B60J 5/0416 |
| 2004/0074149 A1 | * | 4/2004 | Tatsumi | ................ E05F 11/488 |
| | | | | 49/352 |
| 2005/0072050 A1 | * | 4/2005 | Yamamoto | ............ E05F 11/488 |
| | | | | 49/352 |

(Continued)

FOREIGN PATENT DOCUMENTS

| | | | |
|---|---|---|---|
| DE | 102007023001 A1 | | 11/2008 |
| JP | 62001624 A | * | 1/1987 |

(Continued)

OTHER PUBLICATIONS

Office Action issued in the corresponding JP Patent Application No. 2018-007444 dated Mar. 31, 2020.

*Primary Examiner* — Jerry E Redman
(74) *Attorney, Agent, or Firm* — Roberts Calderon Safran & Cole, P.C.

(57) ABSTRACT

A window regulator includes a guide rail provided on a door of a vehicle and arranged along an ascending/descending direction of a window on the door, a carrier plate that slides on the guide rail and moves together with the window, a drive unit including a drum rotationally driven by a motor, cables coupled to the carrier plate at one end and coupled to the drum at an other end, and a stopper that contacts with a contact portion of the carrier plate at a position where the carrier plate is located when the window is fully closed. The stopper and the guide rail are placed side by side in a front-back direction of the vehicle.

3 Claims, 7 Drawing Sheets

(56) References Cited

U.S. PATENT DOCUMENTS

| | | | |
|---|---|---|---|
| 2007/0144073 A1* | 6/2007 | Munezane | E05F 11/483 49/349 |
| 2007/0151161 A1* | 7/2007 | Hernandez | E05F 11/385 49/375 |
| 2010/0043173 A1* | 2/2010 | Barr | E05F 11/382 16/82 |
| 2010/0088968 A1* | 4/2010 | Renke | E05F 11/382 49/502 |
| 2014/0007507 A1* | 1/2014 | Umemura | E05F 11/486 49/349 |
| 2017/0167177 A1* | 6/2017 | Shimizu | E05F 11/483 |
| 2017/0174052 A1* | 6/2017 | Sakurai | E05F 5/06 |
| 2017/0191302 A1* | 7/2017 | Chono | B60J 1/17 |
| 2019/0226264 A1* | 7/2019 | Shiroma | B60J 1/17 |
| 2019/0257134 A1* | 8/2019 | Kashiwabara | E05F 11/486 |
| 2020/0131823 A1* | 4/2020 | Yamamoto | E05F 11/483 |
| 2020/0131833 A1* | 4/2020 | Yamamoto | E05F 11/382 |
| 2020/0131834 A1* | 4/2020 | Yamamoto | B60J 1/17 |
| 2020/0181965 A1* | 6/2020 | Hong | E05F 5/003 |

FOREIGN PATENT DOCUMENTS

| | | | | |
|---|---|---|---|---|
| JP | 62187616 A * | 8/1987 | | |
| JP | 11-294008 A | 10/1999 | | |
| JP | 2012-158939 A | 8/2012 | | |
| JP | 2013-062060 A | 4/2013 | | |
| JP | 2015-013576 A | 1/2015 | | |
| JP | 2017-008544 A | 1/2017 | | |
| WO | WO-2016203776 A1 * | 12/2016 | | B60J 1/17 |
| WO | WO-2018116581 A1 * | 6/2018 | | E05F 15/689 |

* cited by examiner

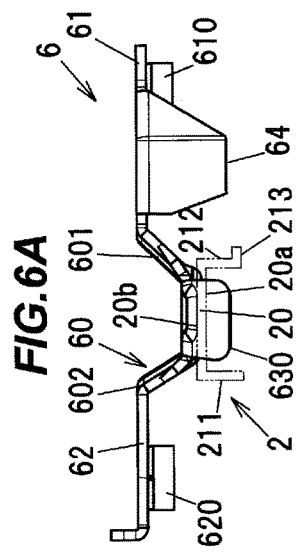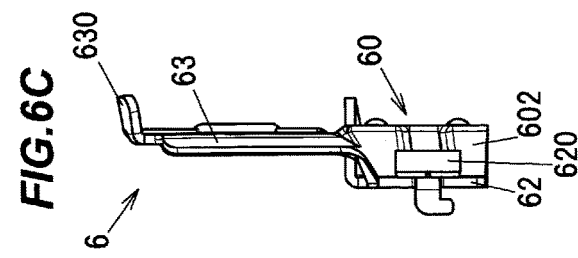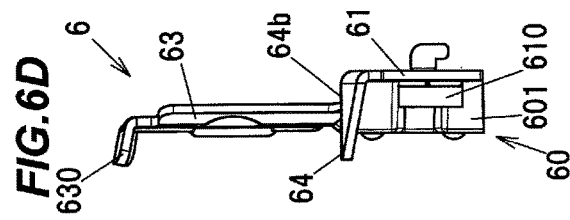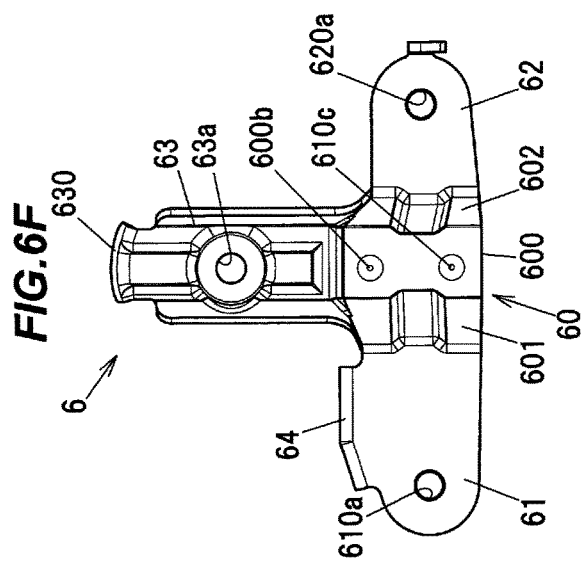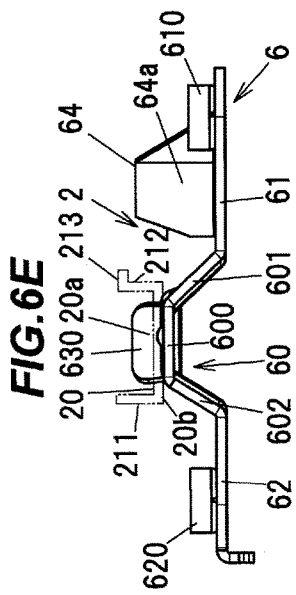

WINDOW REGULATOR

The present application is based on Japanese patent application No. 2018-007444 filed on Jan. 19, 2018, the entire contents of which are incorporated herein by reference.

BACKGROUND OF THE INVENTION

1. Field of the Invention

The invention relates to a window regulator.

2. Description of the Related Art

A window regulator is known which is provided with a metal guide rail provided along an ascending/descending direction of a window, a carrier plate sliding on and guided by the guide rail, cables connected to a drum at one end and connected to the carrier plate at the other end, a direction changing member provided at an upper end of the guide rail, a fastening member for fixing the direction changing member to the guide rail, and a stopper fixed to the guide rail as well as to the direction changing member by the fastening member (see, e.g., JP 2017/008544 A).

In the window regulator, even if the window, door, window frame or the fixing position has a dimensional error, the position of the stopper can be appropriately adjusted to prevent the concentration of a large restraining force on the window and the window frame.

SUMMARY OF THE INVENTION

Along with further weight saving in recent years, the width of the guide rail of the known device may be reduced so as to reduce the weight and dimensions. However, according to the window regulator of JP 2017/008544 A, the longitudinal dimension of the guide rail cannot be significantly reduced since the guide rail needs a space for arranging the stopper thereon. This may prevent the downsizing of the window regulator.

It is an object of the invention to provide a window regulator that can be reduced in the longitudinal dimension of the guide rail so as to attain the downsizing thereof.

According to an embodiment of the invention, a window regulator comprises:
 a guide rail provided on a door of a vehicle and arranged along an ascending/descending direction of a window on the door;
 a carrier plate that slides on the guide rail and moves together with the window;
 a drive unit comprising a drum rotationally driven by a motor;
 cables coupled to the carrier plate at one end and coupled to the drum at an other end; and
 a stopper that contacts with a contact portion of the carrier plate at a position where the carrier plate is located when the window is fully closed,
 wherein the stopper and the guide rail are placed side by side in a front-back direction of the vehicle.

According to another embodiment of the invention, a window regulator comprises:
 a guide rail provided on a door of a vehicle and arranged along an ascending/descending direction of a window on the door;
 a carrier plate that slides on the guide rail and moves together with the window; and
 a stopper that restricts movement of the carrier plate in the ascending direction when the window is fully closed,
 wherein the stopper is arranged at a position not overlapping the guide rail when viewed along a width direction of the vehicle.

Effects of the Invention

According to an embodiment of the invention, a window regulator can be provided that can be reduced in the longitudinal dimension of the guide rail so as to attain the downsizing thereof.

BRIEF DESCRIPTION OF THE DRAWINGS

Next, the present invention will be explained in more detail in conjunction with appended drawings, wherein:

FIGS. 6A to 6F are plan views showing the configuration of the pulley bracket;

DETAILED DESCRIPTION OF THE PREFERRED EMBODIMENTS

Summary of the Embodiment

Figure 1:
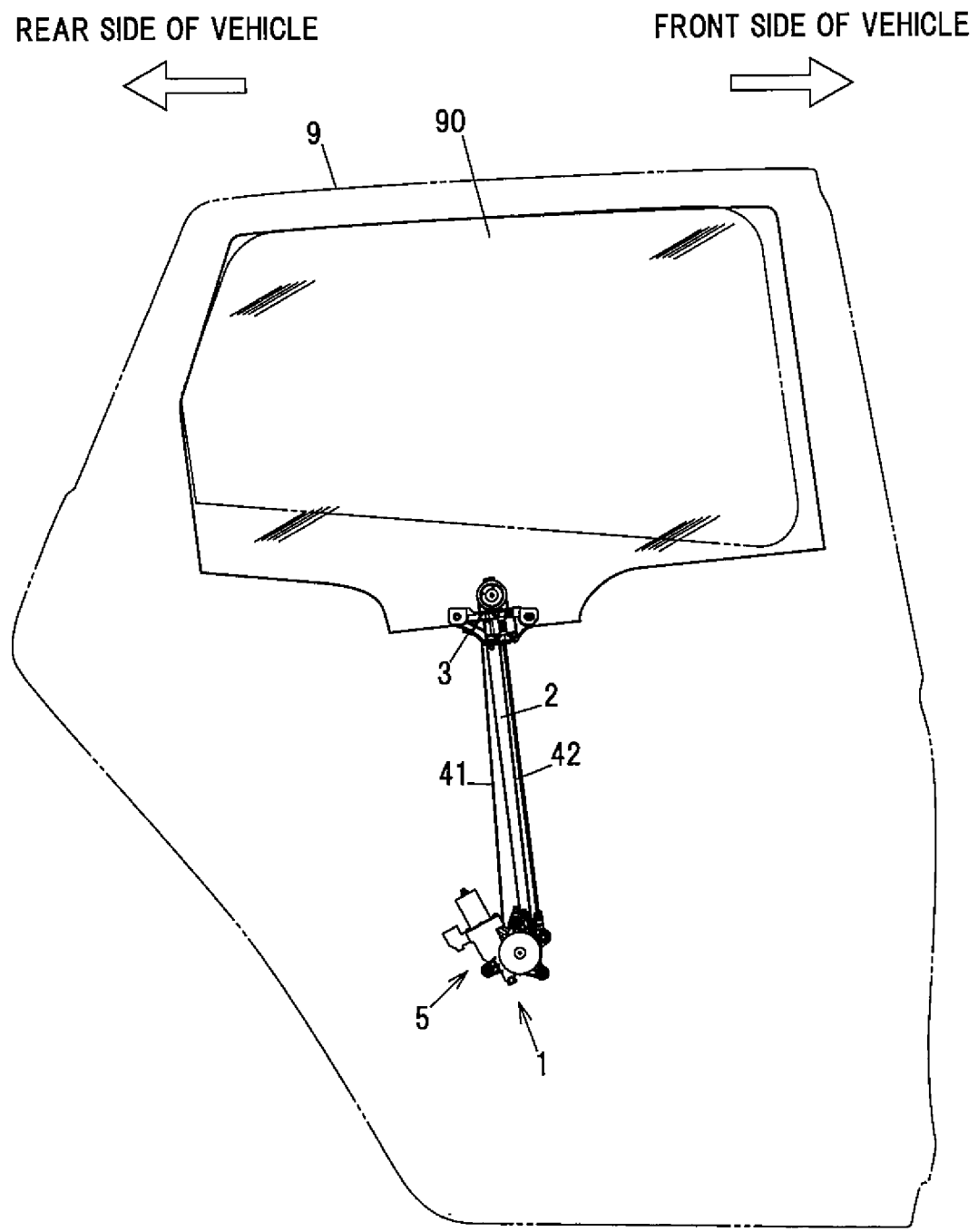
FIG. 1 is a general schematic diagram illustrating a window regulator in an embodiment and a vehicle door mounting the window regulator.

A window regulator 1 in the present embodiment is provided with a guide rail 2 provided on a door 9 of a vehicle and arranged along an ascending/descending direction of a window 90 of the door 9, a carrier plate 3 that slides on the guide rail 2 and moves together with the window 90, a drive unit 5 having a drum 52 rotationally driven by a motor 51, ascending-side and descending-side cables 41 and 42 as cables coupled to the carrier plate 3 at one end and coupled to the drum 52 at the other end, and a stopper portion 64 as a stopper which comes into contact with a contact portion 31 of the carrier plate 3 at a position where the carrier plate 3 is located when the window 90 is fully closed. The stopper portion 64 and the guide rail 2 are arranged side by side in a front-back direction of the vehicle.

In the window regulator 1, a longitudinal length of the guide rail 2 can be smaller than when configured that a stopper for restricting movement of the carrier plate 3 is provided on the guide rail 2. Thus, the window regulator 1 can be reduced in size in the longitudinal direction.

Embodiment

The window regulator 1 in the present embodiment is a device for raising and lowering a window on, e.g., an automobile door and is installed on a door panel of an automobile.

General Configuration of the Window Regulator 1

Figure 2:
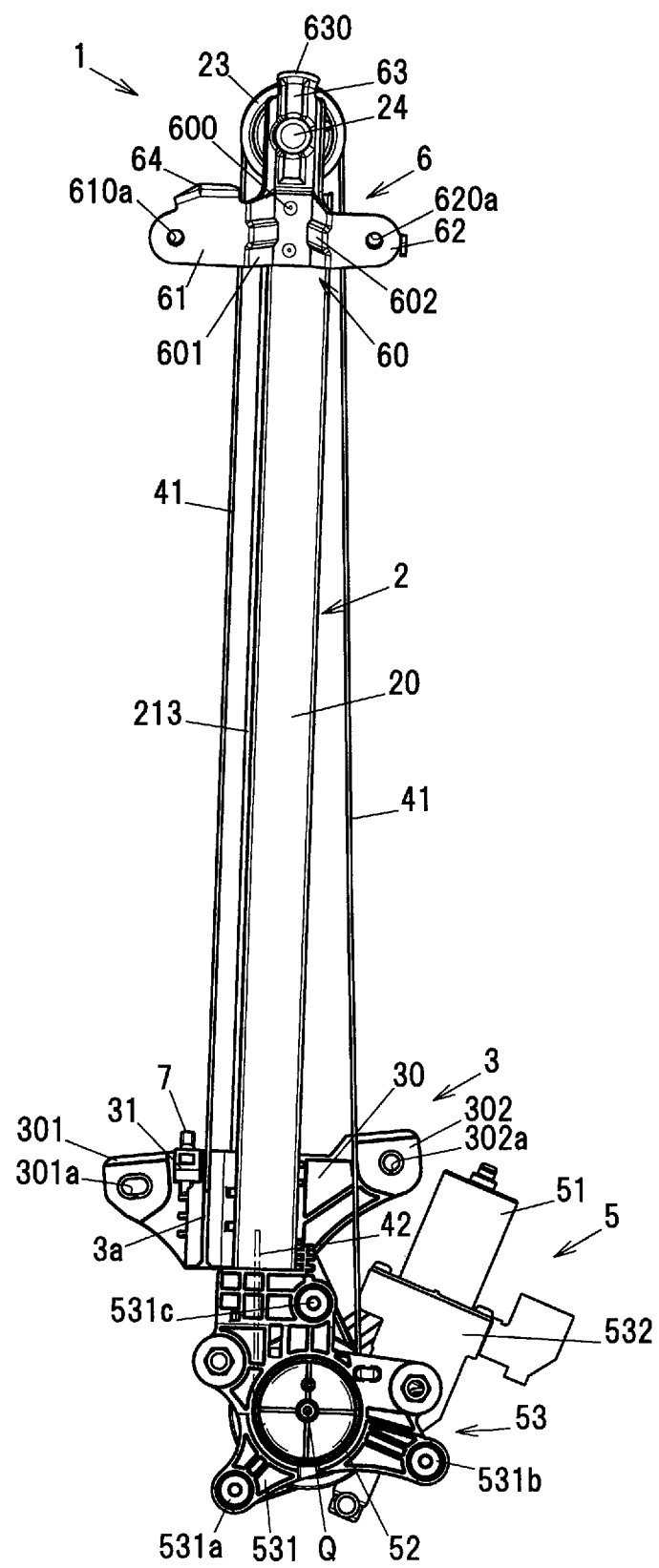
FIG. 2 is an overall view showing a configuration of the window regulator.

FIG. 1 is a general schematic diagram illustrating the window regulator 1 in the present embodiment and the door 9 of a vehicle mounting the window regulator 1. FIG. 2 is an overall view showing a configuration of the window regulator 1. In FIG. 1, the window 90 is in a fully-closed state, and the door 9 and a window frame are indicated by dash-dot-dot lines. In addition, in FIG. 1, the left side of the paper is the rear side in the vehicle front-back direction, the right side of the paper is the front side in the vehicle front-back direction, and the depth direction perpendicular to the paper plane is a direction of the width of the vehicle. FIG. 2 shows a state in which the window 90 is fully opened and the carrier plate is located at the bottom dead center.

As shown in FIGS. 1 and 2, the window regulator 1 is generally composed of the guide rail 2 which is housed in a door panel (not shown) provided on the door 9 of the vehicle and is arranged along an ascending/descending direction of the window 90, the carrier plate 3 which slides on the guide rail 2 and moves together with the window 90, the ascending-side cable 41 and the descending-side cable 42 which are coupled to the carrier plate 3 at one end and coupled to the drum 52 at the other end and pull the carrier plate 3, and the drive unit 5 which generates a driving force for taking up and feeding out the ascending-side cable 41 and the descending-side cable 42.

Configuration of the Guide Rail 2

The guide rail 2 is formed by bending a long metal plate and is arranged so as to tilt to the rear side in the vehicle front-back direction with respect to the door 9. The guide rail 2 integrally has a flat plate portion 20 extending in a longitudinal direction thereof, first and second side plate portions 211 and 212 provided upright from both edges of the flat plate portion 20 which are the edges in a width direction orthogonal to the longitudinal direction thereof, and a flange portion 213 projecting from an end of the second side plate portion 212 toward the side opposite to the flat plate portion 20. Of the first and second side plate portions 211 and 212, the first side plate portion 211 is a side plate portion arranged on the rear side in the vehicle front-back direction. In FIG. 2, the first and second side plate portions 211 and 212 protrude toward the far side from the viewer of the drawing.

Configuration of the Carrier Plate 3

The carrier plate 3 is a plate-shaped member formed of, e.g., a resin such as polyacetal. The carrier plate 3 integrally has a main body 30 sliding on the guide rail 2, first and second supports 301 and 302 respectively provided on both ends of the main body 30 to support the window 90, and the contact portion 31 provided on an upper portion of the main body 30 on the first support 301 side. An elastic member 7 as an elastic body formed of rubber, etc., is arranged on the contact portion 31. Attachment holes 301a and 302a, which are provided to attach a support member (not shown) for supporting the window 90, are respectively provided on the first and second supports 301 and 302.

Configuration of the Ascending-Side Cable 41 and the Descending-Side Cable 42

The ascending-side cable 41 is coupled to the carrier plate 3 at one end, turns at a pulley 23 provided at the top end of the guide rail 2, and is coupled to the drum 52 of the drive unit 5 (described later) at the other end. The descending-side cable 42 is coupled to the carrier plate 3 at one end and is coupled to the drum 52 at the other end.

The ascending-side cable 41 is routed so as not to overlap the guide rail 2 between the pulley 23 and the drum 52 when viewed in a direction along a rotational axis Q of the drum 52 (the direction of the width of the vehicle). The descending-side cable 42 is routed so as to overlap the guide rail 2 between the carrier plate 3 and the drum 52 when viewed in a direction along the rotational axis Q of the drum 52. In FIG. 2, the descending-side cable 42 arranged on the back side of the guide rail 2 is indicated by a dash-dot-dot line.

The pulley 23 supports the ascending-side cable 41 on the upper end side of the guide rail 2. The pulley 23 is an example of "the cable support member" of the invention. The pulley 23 is attached to a pulley bracket 6 which is fixed to the guide rail 2. The pulley 23 is supported by a pin portion 24 provided at the center thereof and is rotatably attached to the pulley bracket 6.

The pulley bracket 6 has the stopper portion 64 which comes into contact with the contact portion 31 of the carrier plate 3 when the window 90 is fully closed and the carrier plate 3 is located at the top dead center.

The stopper portion 64 of the pulley bracket 6 and the guide rail 2 are arranged side by side in the vehicle front-back direction. The stopper portion 64 is arranged at a position not overlapping the guide rail 2 when viewed in the direction of the width of the vehicle so that the ascending-side cable 41 routed between the pulley 23 and the carrier plate 3 is sandwiched between the guide rail 2 and the stopper portion 64 in the vehicle front-back direction. In this configuration, the contact portion 31 of the ascending carrier plate 3 comes into contact with the stopper portion 64 of the pulley bracket 6 on the outer side of the guide rail 2. The details of the pulley bracket 6 will be described later.

Configuration of the Drive Unit 5

The drive unit 5 has the motor 51 with reducer, the cylindrical drum 52 (indicated by a dashed line in FIG. 2) which is rotationally driven by the motor 51 and rotates to take up and feed out the ascending-side cable 41 and the descending-side cable 42, and a housing 53 which is provided at a lower end of the guide rail 2 to hold the motor 51 and house the drum 52. The housing 53 is composed of a drum housing 531 having a drum housing portion for housing the drum 52, and a motor housing 532 fitted to the lower end of the guide rail 2 and holding the motor 51. The drum housing 531 and the motor housing 532 are fastened to each other by first to third fixing portions 531a to 531c.

Details of the Carrier Plate 3

Next, the carrier plate 3 will be described in reference to FIGS. 3 and 4.

Figure 3:
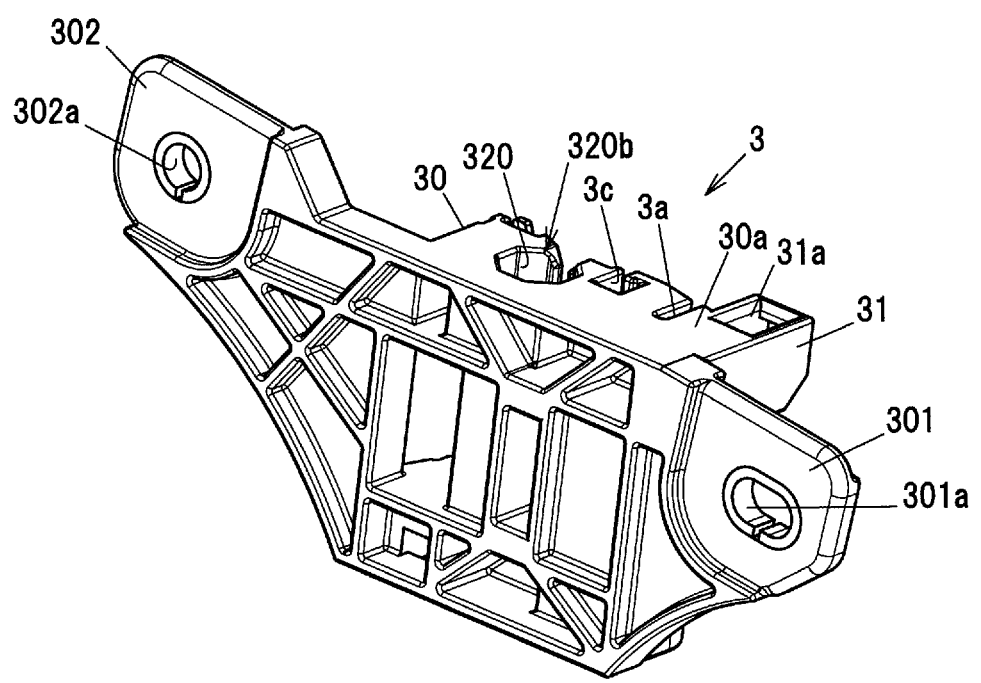
FIG. 3 is a perspective view showing a configuration of a carrier plate.
Figure 4:
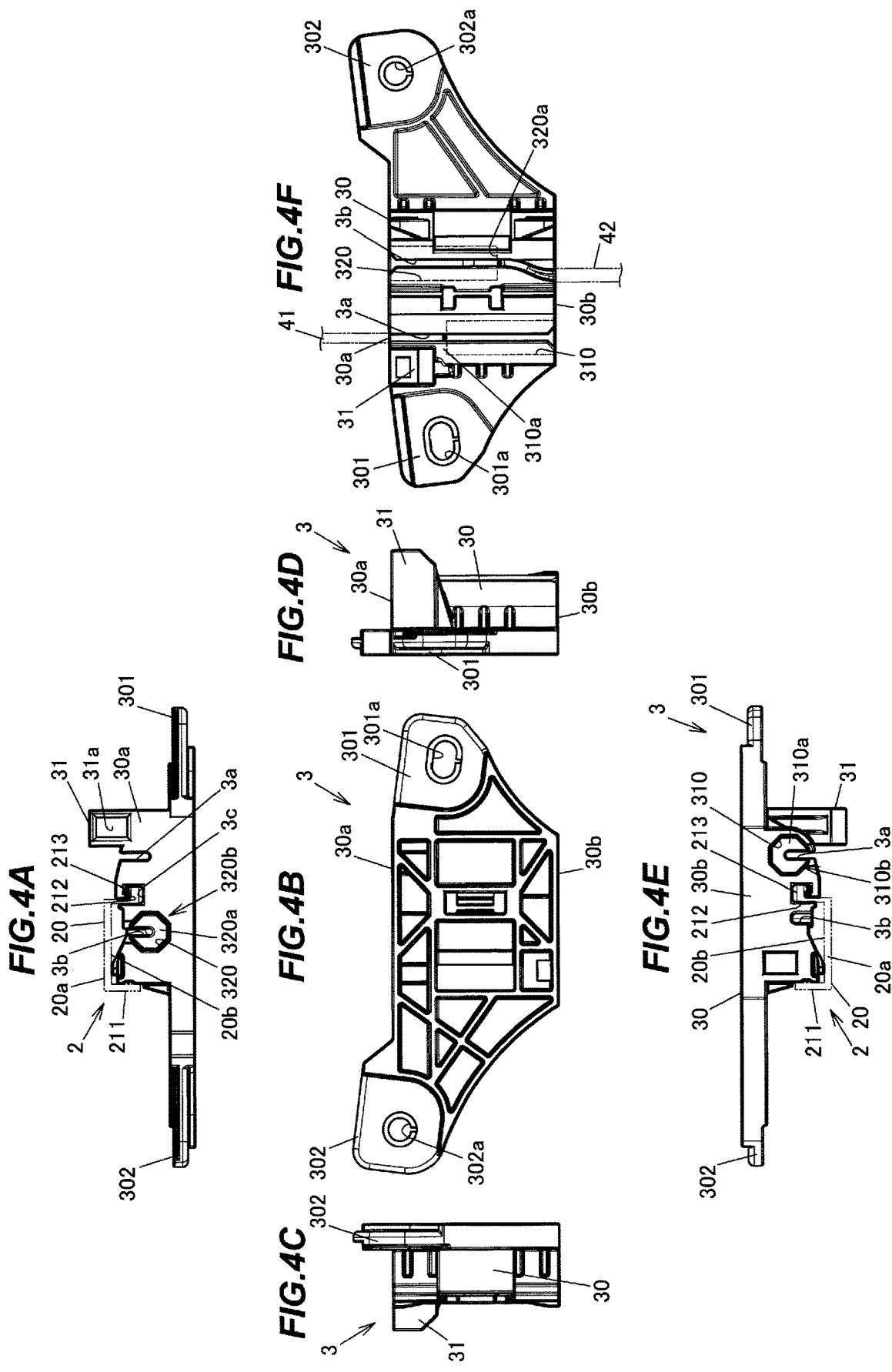
FIGS. 4A to 4F are plan views showing the configuration of the carrier plate.

FIG. 3 is a perspective view showing a configuration of the carrier plate 3. FIGS. 4A to 4F are plan views showing a configuration example of the carrier plate 3, wherein FIG. 4A is a top view, FIG. 4B is a front view, FIG. 4C is a left side view, FIG. 4D is a right side view, FIG. 4E is a bottom view and FIG. 4F is a back view. The guide rail 2 is indicated by a dash-dot-dot line in FIGS. 4A and 4E, and the ascending-side cable 41 and the descending-side cable 42 are indicated by dash-dot-dot lines in FIG. 4F. Furthermore, in FIG. 4F, an ascending-side housing portion 310 and a descending-side housing portion 320 (described later) are indicated by dashed lines.

The carrier plate 3 is provided with the ascending-side housing portion 310 and the descending-side housing portion 320. The ascending-side housing portion 310 houses an end of the ascending-side cable 41 and a spring (not shown) applying a tensile force to the ascending-side cable 41. The descending-side housing portion 320 houses an end of the descending-side cable 42 and a spring (not shown) applying a tensile force to the descending-side cable 42.

As shown in FIG. 4A, the descending-side housing portion 320 has a bottomed cylindrical shape and has an opening on an upper surface 30a at which the carrier plate 3 faces the pulley 23 at the top dead center of the carrier plate 3. A bottom surface 320a of the descending-side housing portion 320 can be seen from the outside of the carrier plate 3 through the opening. The top dead center of the carrier plate 3 here is the uppermost point on the guide rail 2 within the travel range in which the carrier plate 3 can move on the guide rail 2.

As shown in FIG. 4E, the ascending-side housing portion 310 has a bottomed cylindrical shape and has an opening on a bottom surface 30b at which the carrier plate 3 faces the housing 53 at the bottom dead center of the carrier plate 3. A bottom surface 310a of the ascending-side housing portion 310 can be seen from the outside of the carrier plate 3 through the opening. The bottom dead center of the carrier plate 3 here is the lowermost point on the guide rail 2 within the travel range in which the carrier plate 3 can move on the guide rail 2.

As shown in FIG. 4B, plural ribs are provided on an end face of the carrier plate 3 which is a surface located on the side opposite to the surface facing the guide rail 2. Rigidity of the carrier plate 3 is thereby improved.

As shown in FIGS. 4A and 4E, an ascending-side slit 3a, a descending-side slit 3b and a fitting groove 3c are formed on the main body 30 of the carrier plate 3. The ascending-side slit 3a and the descending-side slit 3b serve as housing entrances used when placing the ascending-side cable 41 and the descending-side cable 42 in the ascending-side housing portion 310 and the descending-side housing portion 320. The fitting groove 3c receives the flange portion 213 of the guide rail 2 which is fitted thereto. The ascending-side housing portion 310 and the descending-side housing portion 320 have a substantially regular octagonal shape when viewed in a direction along the central axis thereof. However, the shape of the ascending-side housing portion 310 and the descending-side housing portion 320 is not limited thereto and may be, e.g., a circular shape or a regular hexagonal shape.

The ascending-side slit 3a extends across the carrier plate 3 from the upper surface 30a to the bottom surface 30b. In addition, the ascending-side slit 3a has an opening on the end face of the carrier plate 3 facing the guide rail 2 and is connected to a housing space of the ascending-side housing portion 310.

Likewise, the descending-side slit 3b extends across the carrier plate 3 from the upper surface 30a to the bottom surface 30b. In addition, the descending-side slit 3b has an opening on the end face of the carrier plate 3 facing the guide rail 2 and is connected to a housing space of the descending-side housing portion 320.

The contact portion 31 of the carrier plate 3 is provided at a position shifted from the guide rail 2 in the vehicle front-back direction and protrudes from the main body 30 of the carrier plate 3 on the side where the guide rail 2 is located. In addition, a substantially rectangular locking hole 31a engaging the elastic member 7 is formed on the contact portion 31 of the carrier plate 3.

Pulley Bracket 6

Figure 5:
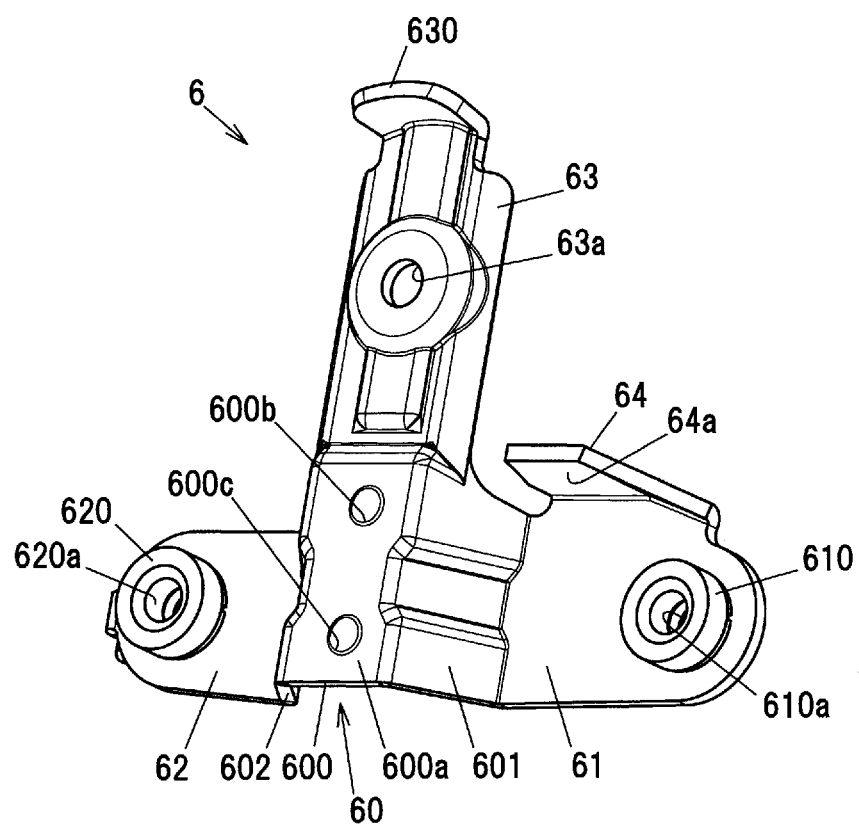
FIG. 5 is a perspective view showing a configuration of a pulley bracket.
Figure 7A:
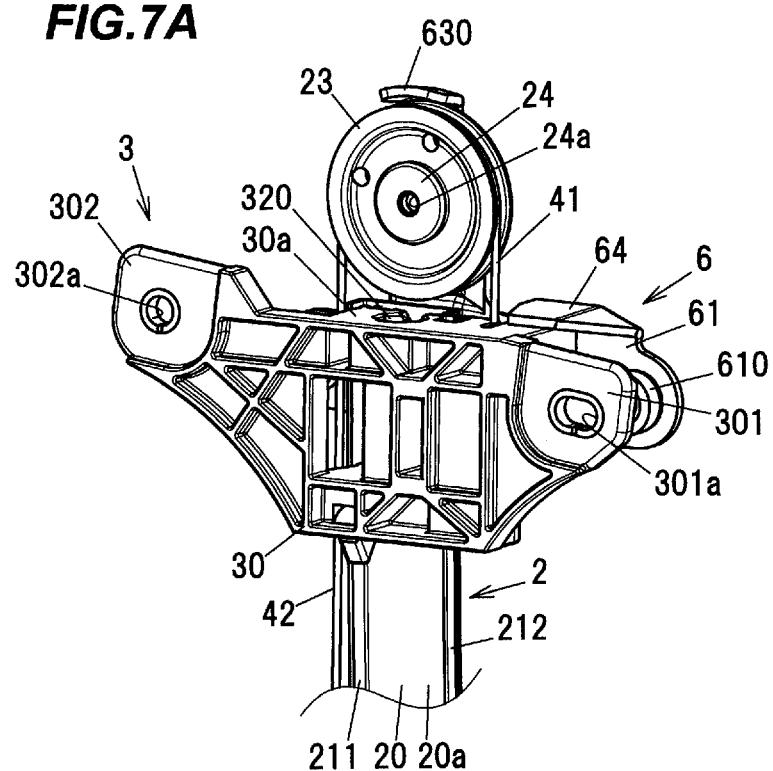
FIG. 7A is an explanatory diagram illustrating a state in which the carrier plate is in contact with a stopper portion of the pulley bracket.
Figure 7B:
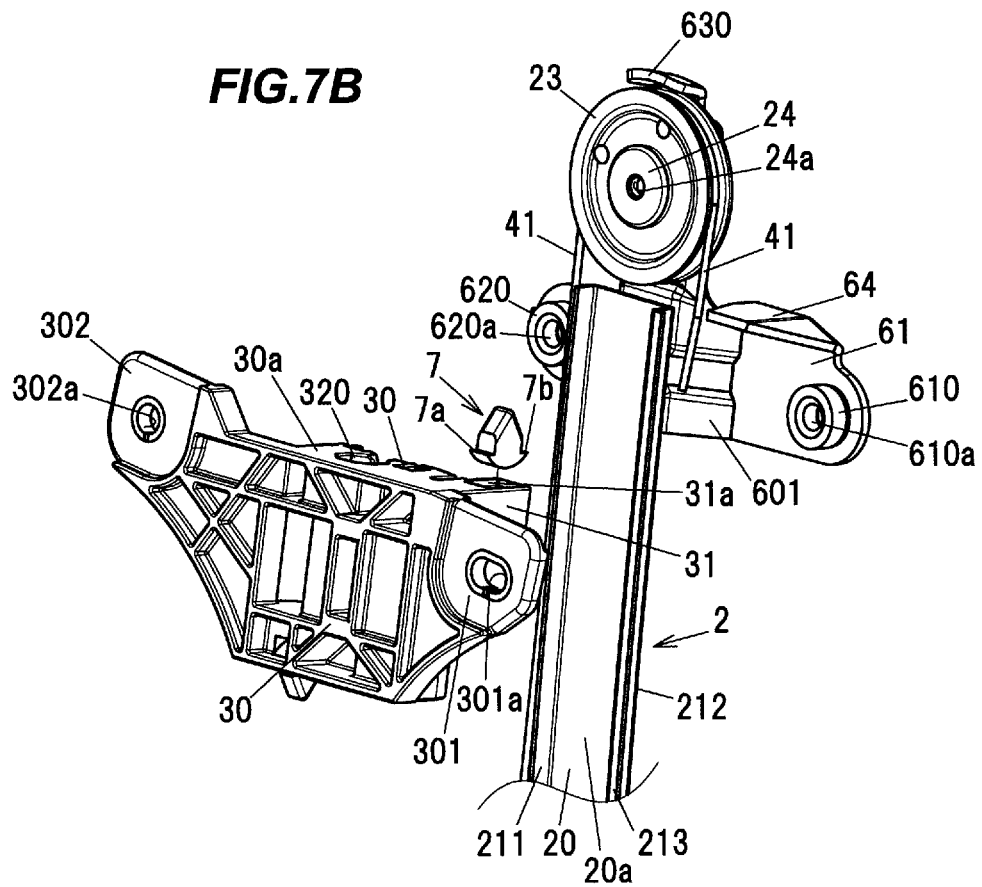
FIG. 7B is an explanatory diagram illustrating a state in which the carrier plate is detached from the guide rail.

Next, the configuration of the pulley bracket 6 will be described in reference to FIGS. 5 to 7. FIG. 5 is a perspective view showing a configuration of the pulley bracket 6. FIGS. 6A to 6F are plan views showing the configuration of the pulley bracket 6, wherein FIG. 6A is a top view, FIG. 6B is a front view, FIG. 6C is a left side view, FIG. 6D is a right side view, FIG. 6E is a bottom view and FIG. 6F is a back view. FIG. 7A is an explanatory diagram illustrating a state in which the carrier plate 3 is in contact with the stopper portion 64 of the pulley bracket 6 and FIG. 7B is an explanatory diagram illustrating a state in which the carrier plate 3 is detached from the guide rail 2.

As shown in FIGS. 5 and 6B, the pulley bracket 6 is, e.g., a metal member and integrally has a fixed portion 60, first and second attached portions 61 and 62, a pulley support portion 63, and the stopper portion 64. The fixed portion 60 is fixed to a back surface 20b of the guide rail 2 opposite to a front surface 20a on which the carrier plate 3 slides (see FIGS. 6A and 6E). The first and second attached portions 61 and 62 extend in a direction of the width of the guide rail 2 (in the vehicle front-back direction shown in FIG. 1) respectively from both ends of the fixed portion 60 and are attached to the door 9. The pulley support portion 63 extends from the upper end of the fixed portion 60 and supports the pulley 23. The stopper portion 64 is provided at the upper end of the first attached portion 61.

The fixed portion 60 of the pulley bracket 6 has a flat portion 600 to be fixed to the flat plate portion 20 of the guide rail 2, and first and second inclined portions 601 and 602 extending at an inclination respectively from both ends of the flat portion 600. The flat portion 600 of the fixed portion 60 has first and second projections 600b and 600c provided for projection welding to the flat plate portion 20 of the guide rail 2. An end face 600a (a surface facing the guide rail 2) of the flat portion 600 of the fixed portion 60 is formed as an attachment surface to be attached to the back surface 20b of the flat plate portion 20 of the guide rail 2.

As shown in FIGS. 6A and 6E, the first inclined portion 601 of the fixed portion 60 is inclined so that a distance from the flat plate portion 20 of the guide rail 2 increases from an end portion of the flat portion 600 toward the first attached portion 61. Likewise, the second inclined portion 602 is also inclined so that a distance from the flat plate portion 20 of the guide rail 2 increases from the other end portion of the flat portion 600 toward the second attached portion 62.

The first attached portion 61 of the pulley bracket 6 has a column-shaped first door attachment portion 610 provided for attaching the pulley bracket 6 to a panel of the door 9. Likewise, the second attached portion 62 has a column-shaped second door attachment portion 620 provided for attaching the pulley bracket 6 to the panel of the door 9. The first door attachment portion 610 has a through-hole 610a through which a fastening member such as bolt is inserted. Likewise, the second door attachment portion 620 also has a through-hole 620a through which a fastening member is inserted.

The pulley support portion 63 of the pulley bracket 6 has an insertion opening 63a through which the pin portion 24 is inserted. The pulley support portion 63 also has a protruding portion 630 which is provided at the upper end and protrudes on the side where the guide rail 2 is located. The pulley 23 and the ascending-side cable 41 are protected by the protruding portion 630 when the upper end of the window regulator 1 comes into contact with the inner side of a door panel (not shown) at the time of attaching the window regulator 1 to the door panel.

The stopper portion 64 of the pulley bracket 6 protrudes from the upper end of the first attached portion 61 on the side where the guide rail 2 is located. The stopper portion 64 is formed by bending a metal body and is integral with the first attached portion 61. In other words, the stopper portion 64 is integrally provided on the pulley bracket 6 which fixes the pulley 23 as the cable support member to the guide rail 2. The pulley bracket 6 is an example of "the fixing member" of the invention.

As shown in FIGS. 6C and 6D, the stopper portion 64 protrudes beyond the end face 600a of the flat portion 600 of the fixed portion 60.

As shown in FIGS. 5 and 7A, a lower surface 64a of the stopper portion 64 comes, in a travel direction of the carrier plate 3, into the contact portion 31 of the carrier plate 3 located at the top dead center. In other words, the stopper portion 64 comes into the contact portion 31 of the carrier plate 3 and thereby restricts the carrier plate 3 at the top dead center from further moving in the ascending direction.

As shown in FIG. 7B, the elastic member 7 is provided at a position where the contact portion 31 of the carrier plate 3 faces the stopper portion 64 of the pulley bracket 6 when the carrier plate 3 is located at the top dead center, and the elastic member 7 cushions impacts between the contact portion 31 and the stopper portion 64. In the state shown in FIG. 7A in which the carrier plate 3 is located at the top dead center, the elastic member 7 is elastically compressed in the travel direction of the carrier plate 3. As a modification, an elastic body may be arranged on the stopper portion 64 of the pulley bracket 6.

The stopper portion 64 only needs to be provided on the upper portion of at least one of the first and second attached portions 61 and 62. For example, the stopper portion 64 may be provided at the upper end of the second attached portion 62. In this case, the contact portion 31 of the carrier plate 3 is arranged on the second support 302 so that the contact portion 31 of the carrier plate 3 can come into contact with the stopper portion 64.

As shown in FIG. 7B, first and second locking claws 7a and 7b engaging the locking hole 31a of the contact portion 31 of the carrier plate 3 are formed on the elastic member 7. Thus, the elastic member 7 is prevented from slipping out of the carrier plate 3.

In the present embodiment, since the stopper portion 64 of the pulley bracket 6 and the guide rail 2 are arranged side by side in the vehicle front-back direction, it is possible to reduce the size of the device by reducing the longitudinal dimension of the guide rail 2. In detail, since the travel distance of the window (the travel range of the carrier plate 3) is determined by the type of vehicle and the shape of the window frame, a component equivalent to the stopper portion 64, when provided on, e.g., the guide rail 2, causes the longitudinal dimension of the guide rail 2 to be increased by the installation space. On the other hand, the longitudinal dimension of the guide rail 2 is reduced in the present embodiment since the stopper portion 64 for restricting the movement of the carrier plate 3 is provided on the outer side of the guide rail 2. Thus, the weight of the window regulator 1 is reduced.

In addition, since the stopper portion 64 is integrally provided on the pulley bracket 6 as the fixing member which fixes the pulley 23 as the cable support member to the guide rail 2, the number of components is smaller than when a component equivalent to the stopper portion 64 is provided separately.

Although the embodiment of the invention has been described, the invention according to claims is not to be limited to the embodiment. For example, although only the pulley 23 is described in the present embodiment as an example of the cable support member of the invention, it is not limited thereto. The cable support member may be, e.g., a resin cable guide member which is fitted to the upper end of the guide rail 2 and has arc-shaped sliding grooves in which the cables slides.

In addition, although the stopper portion 64 is integrally provided on the pulley bracket 6, a stopper for restricting the movement of the carrier plate 3 may be a separate component from the pulley bracket 6, as a modification. In this case, a component equivalent to the stopper is fixed by, e.g., welding or fitting.

Further, please note that all combinations of the features described in the embodiment are not necessary to solve the problem of the invention. The invention can be appropriately modified and implemented without departing from the gist thereof.

What is claimed is:

1. A window regulator, comprising:
a guide rail provided on a door of a vehicle and arranged along an ascending/descending direction of a window on the door;
a carrier plate that slides on the guide rail and moves together with the window;
a drive unit comprising a drum rotationally driven by a motor;
cables coupled to the carrier plate at one end and coupled to the drum at an other end; and,
a stopper that contacts with a contact portion of the carrier plate at a position where the carrier plate is located when the window is fully closed; and
a fixing member that comprises a fixed portion and a pair of attached portions, wherein the fixed portion is fixed to a surface of the guide rail opposite to the surface on which the carrier plate slides, and wherein the pair of attached portions extend in a direction of a width of the guide rail respectively from both ends of the fixed member and being attached to the door,
wherein the stopper and the guide rail are placed side by side in a front-back direction of the vehicle,
wherein the stopper is integrated with at least one of the pair of attached portions.

2. The window regulator according to claim 1, further comprising a cable support member arranged at an upper end of the guide rail to support the cables,
wherein the stopper is integrated with the fixing member that fixes the cable support member to the guide rail.

3. The window regulator according to claim 1, wherein an elastic body is provided between the contact portion of the carrier plate and the stopper so as to buffer an impact therebetween.

* * * * *